July 5, 1949.　　　　　J. W. NAPIER　　　　　2,475,579
TIRE RECAPPING APPARATUS
Original Filed April 15, 1945　　　　　　　　　3 Sheets-Sheet 1
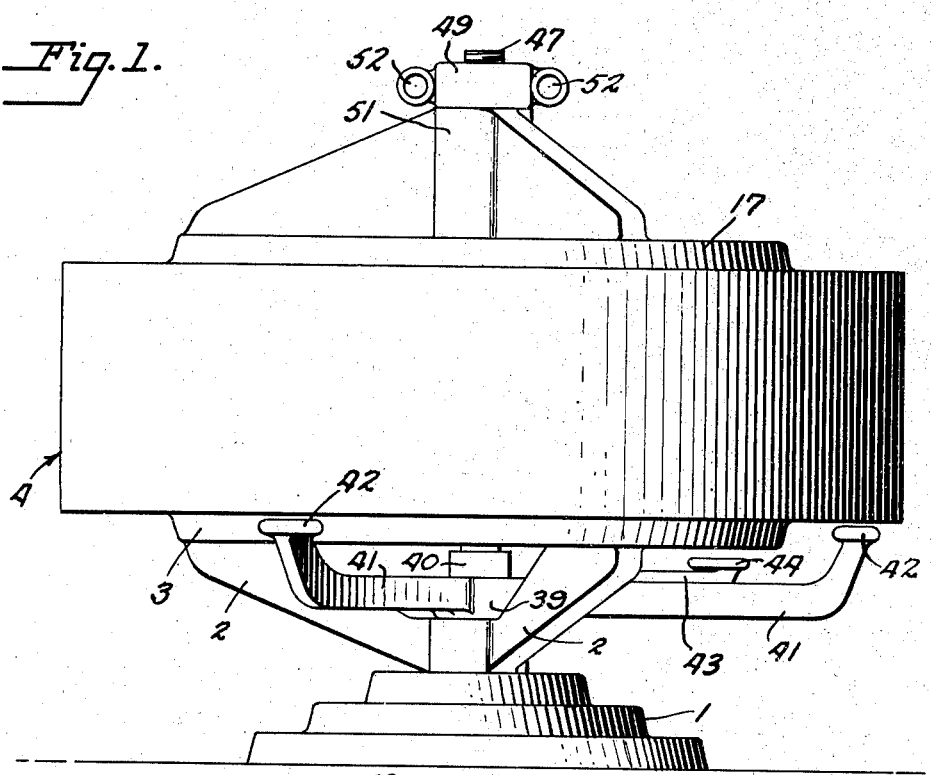
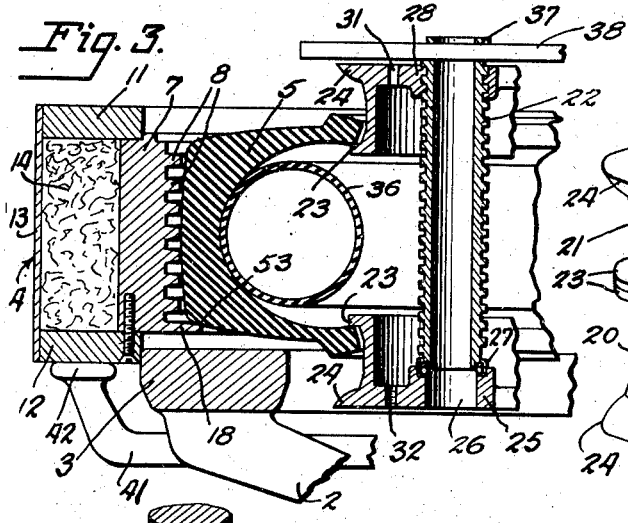
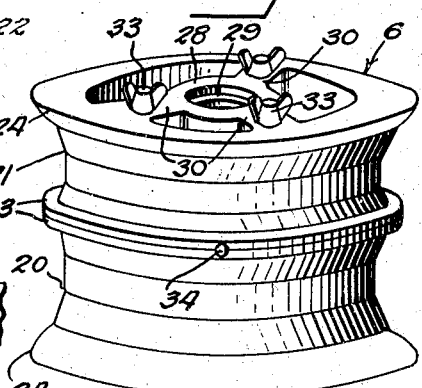
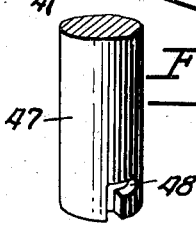
Inventor
J. W. Napier
By Mason Fenwick & Lawrence
Attorneys

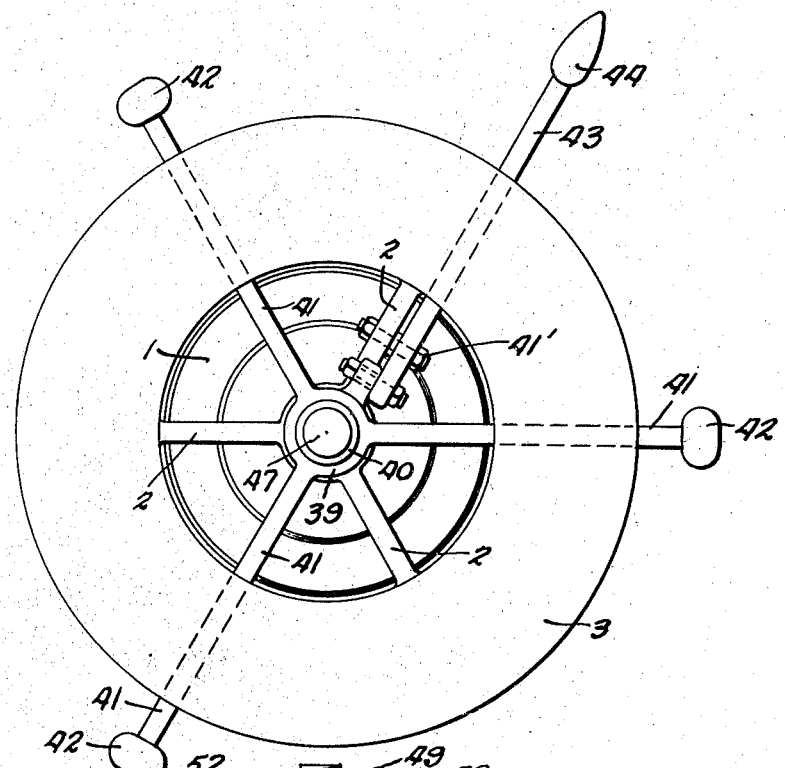
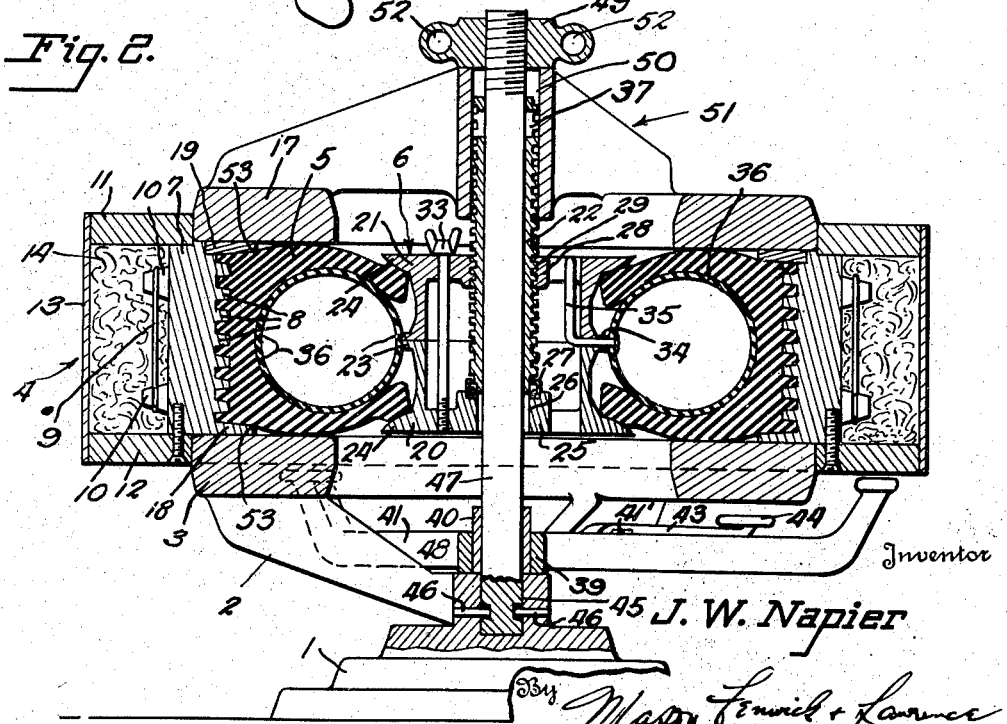

July 5, 1949.  J. W. NAPIER  2,475,579
TIRE RECAPPING APPARATUS
Original Filed April 15, 1945  3 Sheets-Sheet 3
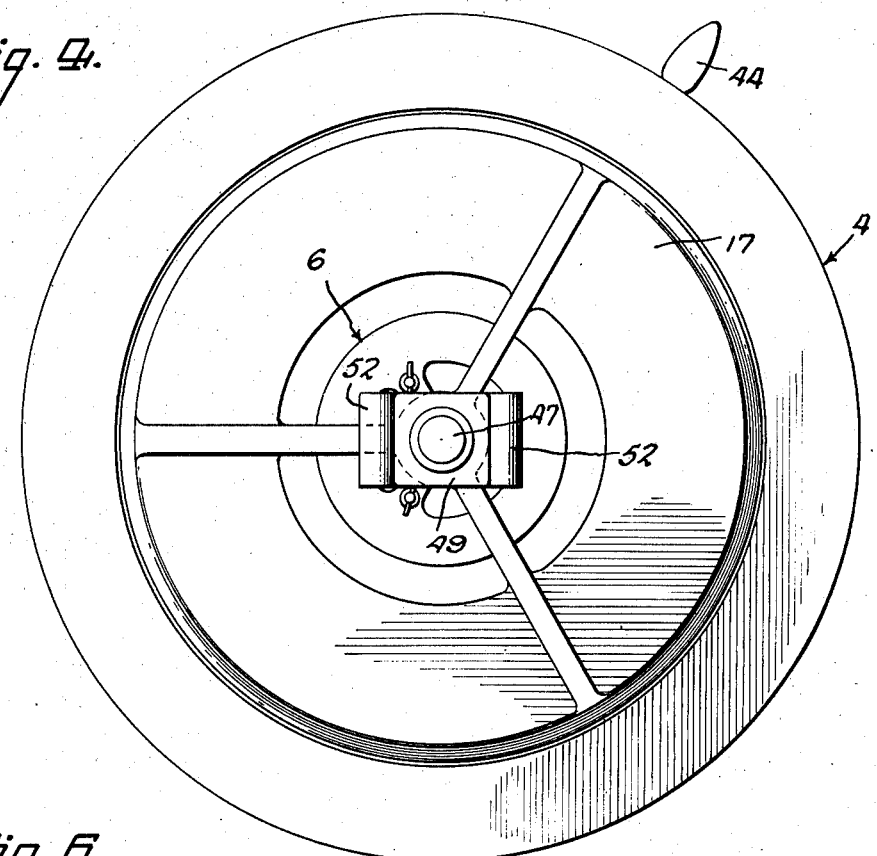
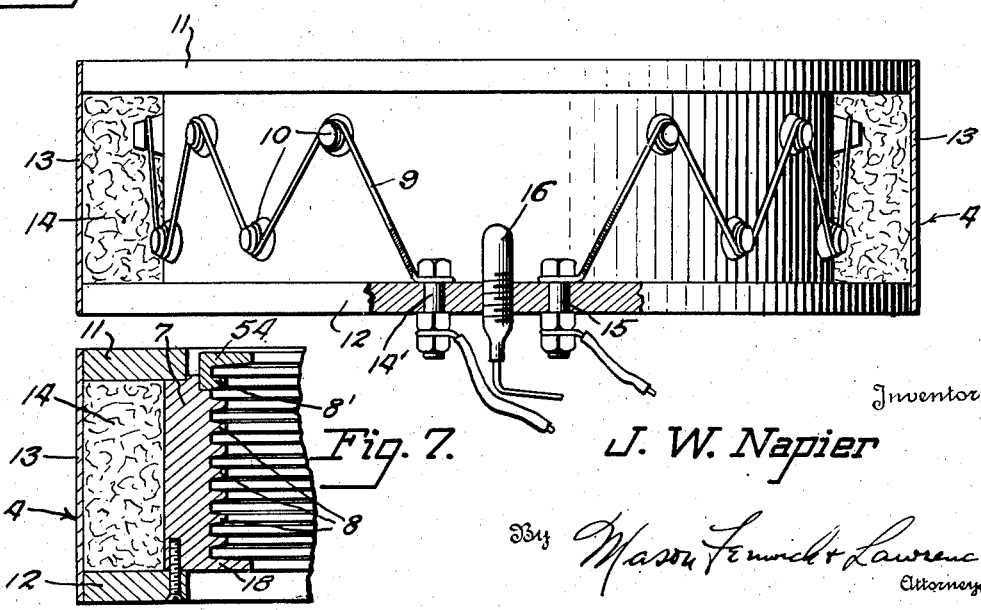
Inventor
J. W. Napier
By Mason Fenwick & Lawrence
Attorneys Patented July 5, 1949

2,475,579

UNITED STATES PATENT OFFICE 2,475,579

TIRE RECAPPING APPARATUS

James W. Napier, Macon, Ga., assignor to Clement O. Dennis, Macon, Ga.

Continuation of application Serial No. 586,684, April 15, 1945. This application December 5, 1947, Serial No. 789,989

15 Claims. (Cl. 18—18)

This invention relates to recapping apparatus for tire casings. It has for its general object the provision of an electrically heated recapping machine characterized by lightness in weight and simplicity of construction, which by virtue of the novel construction and arrangement of parts will do a superior job, with conservation of heat and materials, and in a much more facile and efficient manner than that which characterizes other recapping apparatus.

Among the more specific objects of the invention is to provide a continuous annular mold matrix having alternating tread forming ridges and grooves, the diameter of the hole circumferentially bounded by the tops of the ridges being smaller than that of the casing plus the attached tread strip which is to be inserted into said hole, but said hole being sufficiently large to encompass the casing and tread strip without compressing the casing when the thickness of the tread strip has been reduced by the flow of part of its substance into said grooves, filling the same, together with complementary means for spreading the casing axially, thereby reducing its diameter to the extent that it, including the attached tread strip, can be freely inserted into the mold matrix prior to molding, or withdrawn from the mold matrix after molding.

Another object of the invention is to provide a casing spreading unit comprising a pair of bead engaging rims with means for moving them axially toward or away from one another, said rims being of such width as to abut endwise when the casing is in molding position and to serve as the inner confining means for the inflated tube, thus avoiding the need for the usual abutment ring.

A further object of the invention is to provide an outer annular matrix liftable with respect to its support, on the one hand, relative to the casing for the purpose of bringing its median diametrical plane into the median diametrical plane of the expanded casing, and on the other hand being lifted by the finished tire when the latter is expanded for removal, so as to keep the said median diametrical planes coincident until the diameter of the casing has been diminished to the point at which the matrix drops from the casing.

A further object of the invention is to provide an outer annular mold member having upper and lower side flanges terminating in sharp annular shoulders, against which shoulders the casing is intimately pressed, to form with said shoulders a seal which defines the limit of the molding chamber, prevents exudation of the fluent tread material under pressure onto the side wall of the tire, forms a neat and clean line of demarcation between the recap and side walls, and maintains uniform molding pressure throughout the mass of material in the molding chamber.

Still another object of the invention is to provide a mold matrix capable of taking a larger width of casing, by the substitution for a narrow side flange by a wider side flange constituting a lateral extension of the tread face of the mold.

Another object of the invention is to provide an electrically heated annular mold matrix constructed to confine the heat conduction to that part of the matrix which contacts the casing, and in which uniform curing temperature is thermostatically maintained.

A further object of the invention is to provide recapping apparatus in which the mold matrix is at a low level conducive to easy insertion and removal of the casing, there being a center post which necessarily projects above the matrix, but which is removable to avoid the necessity of lifting the casing above the center post.

Other objects of the invention will appear as the following description of a preferred and practical embodiment thereof proceeds.

This application is a continuation of applicant's pending application for patent Ser. No. 586,684, filed April 5, 1945, for Tire recapping apparatus, now abandoned.

In the drawings which accompany and form a part of the following specification:

Figure 1 is a side elevation of the recapping apparatus embodying the principles of the invention;

Figure 2 is a vertical diametrical section, the mold being closed;

Figure 3 is a fragmentary vertical diametrical section showing the mold in open position;

Figure 4 is a top plan view of Figure 1;

Figure 5 is a top plan view of the base and center post, other parts being omitted;

Figure 6 is a side elevation, partly in section, of the outer mold member;

Figure 7 is a fragmentary vertical sectional view through a portion of the outer mold matrix with a substituted closing flange for making a wider tread;

Figure 8 is a fragmentary perspective view showing the lower end of the removable center post;

Figure 9 is a perspective view of the separator unit.

Referring now in detail to the several figures, there is a base 1, adapted to rest upon the floor, having a fixed spider consisting of the arms 2, which carry an annular platform 3, freely supporting the outer mold matrix 4, and upon which the casing 5 rests, thereby supporting the inner removable rim unit 6.

The outer mold matrix 4 consists of an undivided metallic heat transmitting mold member 7, having an inner tread face with projecting ridges 8. The outer face of the mold member 7 is provided with an electric heating element 9, in close adjacency thereto, but insulated therefrom by being mounted on insulating knobs 10, fixed to the mold member and arranged to distribute the heating element uniformly over the surface of the mold member. The heating element is enclosed in an annular boxing, consisting of the flat upper and lower rings 11 and 12, secured to the end faces of the mold member 7 in outwardly offset relation thereto, and a cylindrical shell 13, secured to the recesses 11 and 12. The enclosed space is filled with rock wool 14.

In the interest of heat conservation, the rings 11 and 12 are preferably made of nonmetallic material, while the shell 13 may be of sheet material, either metal or otherwise. The terminals of the electric heating element are connected to posts 14' and 15, which extend to the exterior of the lower ring 12, and are connected to flexible wires which lead to a thermostatically controlled switch, not shown. The thermostat which controls the switch may be of the bulb type enclosing an expansible fluid, the bulb 16 being shown extending through the ring 12 into the boxing in close adjacency to the mold member 7, so that it responds to the temperature of said mold member, thus keeping the temperature uniform.

The inner diameters of the rings 11 and 12 are sufficiently large to permit the annular platform 3 to seat within the ring 12 directly against the mold member 7, and to permit a clamping ring 17 also to seat directly upon the mold member 7 so that the mold member is pressed between the platform 3 and the clamping ring 17.

The mold member 7 has an integral lower flange 18 extending inwardly beyond the peaks of the ridges 8, while the mold member is provided with a removable upper flange 19 freely seated in a peripheral rabbet in said mold member. The flanges 18 and 19 extend inwardly for a distance, which defines the inner limit of the molding chamber.

The inner diameter of the mold matrix measured between the tops of the tread ridges is less than the diameter of the casing with the uncured tread strip attached, so as to avoid stretching of the casing in the curing operation to make the tread strip fill the mold. However, the mold matrix is sufficiently large to encompass the casing with tread strip attached, without compressing the casing, when the thickness of the tread strip has been reduced by the flow of part of the substance thereof into the grooves between the ridges, to fill the same, so that in the finished uninflated tire the casing is not circumferentially constricted by the tread strip, while the latter will not be under tension when the tire is inflated.

The fact that the casing with attached tread strip is larger than the hole in the mold matrix into which it must be inserted, measured between the tops of the ridges, creates the problem of insertion. This is solved in the present invention by the provision of means for drawing the beads on opposite sides of the casing apart in an axial direction, correspondingly reducing the tread diameter of the casing until it will pass within the circular opening of the mold member.

Said means comprises a pair of rims 20 and 21 and an externally threaded sleeve 22, with which said rims cooperate. Each rim has a bead spreading flange 23 and bead restraining flange 24. The lower rim 20 has a hub 25, with an axial bore 26, having an end thrust bearing 27 in a recess about the inner end of said bore.

The upper rim 21 has a hub 28, with internally threaded axial bore 29 adapted to screw upon the sleeve 22. The hubs of both arms are connected to the peripheral bores by spider arms 30, similarly angularly displaced in both rims. The spider arms of the upper rim have smooth walled apertures 31, which can be aligned with threaded walled apertures 32 in the arms of the lower rim, and the two rims locked together by the wing head bolts 33.

The bead spreading flanges 23 are each slightly larger in diameter than the opening in the casing surrounded by the bead, while the bead restraining flanges 24 may be of materially larger diameter. When the two rims are locked together by the bolts 33, in the position shown in Figure 2, the bead spreading flanges are in contact and the spacing between the bead restraining flanges is substantially that between the flanges of the vehicle wheel which the casing fits.

Each of the adjacent flanges 23 has a semicylindrical channel extending radially thereacross, which channels match when the rims are assembled, as in Figure 2, to form a bore 34 for the passage of the air stem 35 of the inflatable tube 36 which applies molding pressure interiorly to the casing.

The sleeve 22 has a reduced lower end which fits into the hub bore 20 of the lower rim, and forms a shoulder which seats on the thrust bearing 27. The upper end of the sleeve 22 has a diametrical passage 37, in which the turning bar 38 may be freely inserted.

The spreading operation is as follows. The casing, with uncured tread strip cemented thereto, is placed upon the floor or a suitable table, and the inflatable tube 16 inserted in collapsed condition. Then the rims 20 and 21 are separately applied to opposite sides of the casing, the flanges 23 being inserted in the openings surrounded by the beads, by tilting the rims and forcing the flanges through the openings in a diametrical plane. When the rims are then placed parallel, the flanges 23 will not escape from the beads. When the rims are in this position, the lower bead rests upon the lower flange 24, while the upper flange 24 rests against the upper bead, suspending the upper rim, the flange 23 of which may be almost in contact with the adjacent flange 23 of the lower rim. At this time, care should be taken to turn the lower rim until its half of the bore 34 is in the same angular position as the stem 35 of the inflatable tube 36.

The sleeve 22 is then threaded into the hub of the upper rim 21, and screwed down until the shoulder at its lower end abuts the end thrust bearing 27. Further screwing of the sleeve moves the upper rim in an upward direction, separating the beads. As the beads separate, the diameter of the casing diminishes. A little practice teaches how much separation is required to reduce the diameter of the casing to the proper extent for insertion. When the casing has been spread, the turning bar 38 is withdrawn and the casing, together with the rims and sleeve, is ready for insertion into the outer mold member 7. It will be noted from Figure 3 that when the casing is in spread condition, the side walls diverge inwardly from the tread face, so that if the casing were inserted in the apparatus while the mold member 7 is resting upon the platform 3, the lower side wall would contact the platform, preventing the tread portion of the casing from descending fully into the mold member 7. Consequently, means is provided for lifting the mold matrix 4 so that the median diametrical plane of the mold member 7 will coincide with the median diametrical plane of the casing while the latter is resting on the platform 3.

Said means comprises a collar 39, vertically slidable on a hollow boss 40, which forms a part of the base, said collar having symmetrical spaced outwardly extending arms 41 terminating in ends 42 which underlie and are engageable with the mold matrix 4. A rocking lever 43, pivotally supported at an intermediate point 41' on the base, and pivotally connected at one end to the collar 39, has a foot treadle 44, at its opposite end. When the treadle is depressed, the collar is lifted and the arms 41 raise the mold member 4 until the lower flange 18 engages the tread shoulder of the casing, at which point the medial diametrical planes of the mold matrix and casing coincide. Further upward movement of the arms 41 carries the casing upward with the mold matrix, without disturbing their medial diametrically aligned relationship.

The base 1 is provided with an axial socket 45, having pins 46 projecting into its bore. A removable center post 47 extends through the boss 40 and into the socket 45, having bayonet slots 48, at its lower end, engageable with the pins 46, so as to removably connect the center post with the base, said center post being threaded at its upper end for the reception of a clamping nut 49. The post 47 is not in place when the spread casing is placed in the mold.

The clamping nut 49 abuts the hollow hub of a clamping member 51, of which the clamping ring 17, previously referred to, is a part. The bore of the hub is large enough to surround the sleeve 22 over the upper end of which it telescopes when the aperture is assembled for molding. The clamping nut 49 has sockets 52, to receive a turning bar.

For inserting the casing, the clamping nut 49 and clamping member 51 are removed. This frees the removable flange 19 of the outer mold member 7, which is taken off. The center post also is removed. Removal of these parts makes it unnecessary to lift the casing assembly any higher than the top of the outer mold matrix, to insert or remove it.

The casing assembly is inserted while the mold member is resting on the platform 3, as in Figure 3, the divergent lower side of the casing resting upon the platform 3. The treadle 41 is then depressed, lifting the outer mold member until the flange 18 engages the casing and lifts it from the platform 3. The median diametrical planes of the mold member 7 and casing then coincide. While the matrix and casing are in lifted position, the sleeve 22 is unscrewed, permitting the beads of the casing to approach and the diameter of the casing to increase until it obtains a frictional hold against the tread face of the mold member 7. Then the treadle is released, permitting the outer mold matrix again to rest upon the platform 3. The sleeve 22 is then unscrewed to fully release the beads.

At this point in the procedure, the upper rim 21 hangs from the upper bead of the casing, while the lower rim 22 is suspended from the lower bead. The upper rim is then turned to bring its half of the bore 34 in registry with the tube stem and the lower half of said bore. The wing head bolts 33 are then inserted. Since the tube 36 is still deflated, there is enough flexibility in the upper side wall of the casing to permit the upper rim to be pressed down sufficiently for the bolts 33 to engage the threaded apertures 32 in the lower rim. Then the bolts are tightened, bringing the two rims tightly together. Next, the corner post is inserted through the sleeves 22 and turned to interengage the bayonet slots and pin 46. The removable rim 19 is then replaced. Now, the clamping member 51 is slipped over the end of the center post of the sleeve 22, the clamping ring 17 resting upon the flange 19. The clamping nut is next applied to the threaded end of the center post and the nut is turned to bring the clamping ring 17 into tight engagement with the flange 19. Thus, the mold is closed. The tube 36 is now inflated to proper pressure, to press the side walls of the casing into sealing contact with the shoulders 53 of the flanges 18 and 19, and to force the material of the tread strip when made viscous by heat, to fill the depressions in the tread face of the mold member 7. The tube 36 reacts against the rims 20 and 21, no other inner abutment rings being required. The current is turned on, which is controlled thermostatically, and curing of the tread material proceeds.

One of the important features of the invention is that the flanges 18 and 19 terminate in sharp shoulders 53, against which the casing is pressed by the internal inflation pressure, forming a seal between the molding chamber and the side wall. This prevents exudation of the tread strip material while fluid, produces a clean line of demarcation between the recap and side wall, and avoids the necessity of trimming off irregular fringes of tread material from the side wall. The inflation pressure forces the beads against the conical flanges 24 of the rims or wheels 20 and 21, thereby centering the beads, preventing distortion of the casing so that it is maintained in truly circular form during the molding operation.

When the curing process is completed, the molded ridges on the tread face of the casing interdigitate with the ridges on the tread face of the mold member 7. To eject the casing, the clamping nut, clamping member, and bolts 33 are removed, the tube 36 deflated, and the flange 19 removed. The sleeve 22 is then screwed to separate the beads of the casing. This reduces the diameter of the casing and also forces the lower side wall against the platform 3 and thereby lifts the outer mold member matrix from the platform 3. When the diameter of the casing is reduced to the point at which the tread ridges of the casing disengage from the tread ridges of the mold, the outer matrix drops to the platform 3, indicating that the casing is released. The center post may now be taken out and the casing removed from the mold.

It is noted from Figures 2, 3 and 7, that the tread face of the mold member 7 is transversely flat, that is to say, uncurved. This makes a recap of optimum shape from the standpoint of wear. It also enables the same mold member to recap casings of different tread width. This is done merely by substituting for the plain removable upper flange 19, a wider flange 54, Figure 7, providing an additional ridge 8' and an additional adjacent groove. When the larger casing is supported by the lower flange 18, its median diametrical plane is automatically positioned, when the flange 54 is clamped down, coincident with the median plane of the molding chamber, so that the tread face will be symmetrically molded with respect to the median diametrical plane of the casing.

Insofar as applicant is aware, present recapping apparatus is made in such a way that one base will accommodate only a single mold matrix. This is for the reason that the conventional tire spreading apparatus operates against the upper bead of the tire in an upward direction so that the matrix has to be secured to the base to hold it down. In the present invention, since the tire spreading means acts simultaneously in opposite directions against both beads, there is no tendency to pull the mold matrix consequently, it rests freely upon the base, as previously described. This makes it possible to expedite work, as well as to minimize investment, by providing several matrices for different sizes of casing, for a single base. While one tire is being recapped, another matrix may be made ready by being plugged into a socket and preheated. Then when the first casing is cured, the first matrix may be replaced by the preheated matrix, freely supported upon the same base. Since by far the largest market for tire recapping apparatus is the small filling station which does not have sufficient room to accommodate numerous bases with matrices attached, this is quite an important feature from the sales standpoint, as well as operating efficiency.

While I have in the above description disclosed what I believe to be a preferred and practical embodiment of the invention, it will be understood by those skilled in the art that the specific details of construction and arrangement of parts are by way of example and not to be construed as limiting the scope of the invention.

What I claim as my invention is:

1. In tire recapping apparatus of that type wherein the casing with uncured tread strip attached is inserted into an annular tread molding matrix having an internal diameter less than that of the casing with tread strip, a casing spreader for reducing the diameter of the casing comprising a pair of rims each having an axial bore, arranged coaxially, each having a bead engaging flange for insertion within the bead opening and a bead retaining flange to remain outside the bead, an end thrust bearing about the axial bore of one of said rims, the wall of the axial bore of the other being threaded, and a threaded shaft thrusting against said bearing and screwable in said threaded bore for separating said rims.

2. A casing spreader as claimed in claim 1, said shaft being hollow to provide for the insertion of a center post therethrough.

3. A casing spreader as claimed in claim 1, said shaft being hollow for the insertion of a center post therethrough, and means for locking said rims in end to end abutment.

4. In tire casing recapping apparatus, means for confining a casing with enclosed inflating tube, for the molding operation, comprising an outer annular mold member and an inner coaxial abutment member against which the inflation pressure reacts, the interior diameter of said mold member being less than the normal outside diameter of the casing with attached tread strip, said abutment member comprising a pair of coaxial rims, means for locking said rims in endwise engagement, said rims having adjacent flanges slightly larger in diameter than the bead openings of the casing adapted to be forced through opposite bead openings to the inside of the casing, and having additional flanges remote from said first named flanges and larger in diameter than said bead openings, adapted to remain outside the casing and to restrain the spreading of the side walls under inflation pressure when said rims are locked together, and means for separating said rims axially when unlocked, to spread the beads and thereby reduce the diameter of said casing to permit its insertion or ejection with respect to said mold member.

5. In tire recapping apparatus of that type wherein the casing with uncured tread strip attached is inserted into an annular tread molding matrix, a casing spreader for reducing the diameter of the casing comprising a pair of rims each having an axial bore, arranged coaxially, each having a bead engaging flange for insertion within the bead opening and a bead retaining flange to remain outside the bead, an end thrust bearing about the axial bore of one of said rims, the wall of the axial bore of the other being threaded, and a threaded shaft thrusting against said bearing and screwable in said threaded bore for separating said rims.

6. Tire casing recapping apparatus comprising a liftable recap molding matrix unit including a metallic annular tread face molding having spaced inwardly extending upper and lower metallic flanges, defining therewith a metal walled molding chamber, and having non-heat conductive spaced outwardly extending flanges defining therewith a chamber for an electrical heating element, an electrical heating element within the last named chamber arranged about said tread face molding member in close proximity thereto, an annular shell forming a closure for said last named chamber secured to said non-heat conducting flanges, out of metallic contact with said tread face molding member, a fixed support for said matrix unit engageable with said tread face molding member, and lifting elements contacting the lower non-heat conductive flange.

7. A device for spreading the beads of a tire casing comprising a pair of wheel members each having a rim and hub, a radially extending flange on the rim of each wheel to engage under the beads of a tire casing, the hub of one wheel having a concave bearing surface on one side thereof, the hub of the other wheel having a threaded bore, an externally threaded member engaging said threaded bore and having one end seated in said bearing surface, and means for rotating the threaded member to vary the distance between the wheels.

8. A device for spreading the beads of a tire casing comprising a pair of wheel members each having a rim and hub, the perimetral surface of said rim being conical, a radially extending flange adjacent the large diameter of the rim of each wheel to engage under the beads of a tire casing, the hub of one wheel having a concave bearing surface on one side thereof, the hub of the other wheel having a threaded bore, an externally threaded member engaging said threaded bore and having one end seated in said bearing surface, and means for rotating the threaded member to vary the distance between the wheels.

9. A device for spreading the beads of a tire casing comprising a pair of wheel members each having a rim and hub, a radially extending flange on the rim of each wheel to engage under the beads of a tire casing, the hub of one wheel having a concave bearing surface on one side thereof, the hub of the other wheel having a threaded bore, an externally threaded sleeve member engaging said threaded bore and having one end seated in said bearing surface, and means for rotating the threaded sleeve member to vary the distance between the wheels.

10. In apparatus for retreading worn tire-casings, the combination of an annular mold having interiorly thereof a tread-forming matrix, means for heating the matrix to vulcanize the new tread on a casing, a pair of annular pillow blocks arranged to engage the opposite sides of the mold to form a cavity therewith, means for causing the pillow blocks to converge and engage the side walls of a tire to deform the same and force the tread surface against the matrix of the mold when the pillow blocks engage the latter and to diverge to release the same, a shaft mounted axially of the matrix, a pair of members arranged to float in unison axially on said shaft and provided with perimetral portions arranged to engage the beads of a tire from within, and means for causing said members to diverge to spread the tire and reduce its outside diameter for the introduction of the tire into the mold or its removal therefrom, and to converge to permit the tire to be expanded radially within the mold.

11. In apparatus for retreading worn tire-casings, the combination with a annular mold assembly of a unitary structure comprising a pair of superposed annular supports, a pair of opposed annular pillow blocks, respectively carried by the upper perimetral edge of the lower support and the lower perimetral edge of the upper support and arranged to engage the mold assembly from below and above, a shaft extending axially of said supports connecting the latter, means for causing said supports to converge on said shaft, an exteriorly threaded sleeve rotatably mounted and slidable vertically on said shaft, a pair of opposed upper and lower tire-spreading members held in position on said shaft by their contact with the side walls of the tire-casing from within, one of said members being threaded on the sleeve and the other of said members rotatably supporting the lower end of the sleeve, and means to rotate the sleeve to cause said members to converge and to diverge.

12. The structure of claim 11, characterized in that the axial center of the lower of said tire-engaging members is provided with a bearing in which the end of the sleeve is stepped.

13. The method of centering a tire casing in the matrix of a mold preparatory to vulcanizing a new tread on the casing, which comprises the steps of spreading apart the beads of the casing to reduce the outside diameter of the latter, supporting the diametrically reduced casing on a stationary support coaxially of the mold, and then while holding the casing stationary, moving the mold in an axial direction to bring the plane of the mold which is normal to its axis into coincidence with the like plane of the casing and accurately center the matrix and the casing with each other.

14. In tire recapping apparatus of that type wherein the casing with uncured tread strip attached is inserted into an annular tread molding matrix having an internal diameter less than that of the casing with attached uncured tread strip, means for supporting the matrix and the lower side wall of the casing while the tread strip is being molded, means for spreading the side walls of the casing axially to permit insertion of the casing into the matrix, and means for holding said matrix elevated with respect to said supporting means to permit insertion of the casing with spread side walls until the medial diametrical plane of said casing coincides with the medial diametrical plane of said matrix, without said insertion being impeded by contact of said spread lower side wall with said support.

15. In apparatus for retreading tire casings, the combination with an annular mold having internally thereof a tread forming matrix and means for heating the matrix to vulcanize a new tread on the casing, of a pair of annular members engaging the opposite side walls of a tire and the mold to form a cavity with the matrix, a shaft extending axially of the cavity fixed with respect to one of said side wall engaging members, means movably carried by said shaft and engageable with the other of said wall engaging members to cause said side wall engaging members to converge to deform the walls and increase the diameter of the tread surface of the tire, opposed members arranged to engage the beads of the tire from within and to be moved coaxially with the matrix, means mounted on said shaft to cause said opposed members to diverge and spread the beads to reduce the diameter of the tire so as to permit its introduction into or its removal from the mold, and to converge to permit the tire to expand radially in the mold.

JAMES W. NAPIER.

REFERENCES CITED

The following references are of record in the file of this patent:

UNITED STATES PATENTS

| Number | Name | Date |
| --- | --- | --- |
| 2,147,339 | Glynn | Feb. 14, 1939 |
| 2,155,906 | Rihn et al. | Apr. 25, 1939 |
| 2,184,119 | Glynn | Dec. 19, 1939 |
| 2,272,231 | Voth | Feb. 10, 1942 |
| 2,371,238 | Heintz | Mar. 13, 1945 |
| 2,422,788 | Kraft | June 24, 1947 |